ns
3,551,369
ANTIFOULING COMPOSITIONS COMPRISING A DISPERSION OF A MIXED POWDER IN A CARRIER

Katsuji Shimizu, 3-79 Miyahara, Omiya, Saitama, Japan, and Kinzo Sekiyama, 1248 Shukugawara, Kawasaki, Kanagawa, Japan
No Drawing. Filed June 12, 1968, Ser. No. 736,284
Int. Cl. C09d 3/42, 5/16
U.S. Cl. 260—23.3
3 Claims

ABSTRACT OF THE DISCLOSURE

An antifouling composition, comprising a dispersion of a mixed powder in a carrier, the mixed powder comprising a substance toxic to sea organisms and a complex of a non-crystalline sodium silicate and a colloidal aluminum silicate, the grains of said mixed powder being coated with a water-soluble synthetic resin in the state of a gel.

---

This invention relates to antifouling compositions to be used in marine paints for ships' bottoms and offshore structures. The principal object of the present invention is to provide antifouling compositions which are most effective in preventing sea organisms from adhering to the wooden, concrete or metallic surfaces of ships' bottoms and structures in ports and harbours, and to glass, bamboo or synthetic resin floats, metallic anchors, shell and fish farming facilities, and to a wide variety of equipment including cages and rafts immersed in sea water for extended periods of time.

According to the present invention, there is provided in antifouling composition comprising a dispersion of a mixed powder in a carrier, wherein the mixed powder comprises a substance toxic to sea organisms and a complex of a non-crystalline sodium silicate and a colloidal aluminum silicate, the grains of the mixed powder being coated with a water soluble synthetic resin in a gel state.

Ordinary marine paints in use for protecting structures immersed in sea water in the manner described above are required to have such chemical properties as anti-rust, anti-corrosive, anti-fouling and water-proofing. Furthermore, emphasis is placed on the simplicity of application and preservation as well as low cost.

The marine paints as used theretofore are generally of the following types:

(1) Paints combining undercoating and finish coating materials, wherein the former, as an anti-rust paint, is prepared by kneading red oxide and zinc white in an oil varnish, while the latter, as an anti-fouling paint, is prepared by kneading red oxide in an oil varnish and then by adding one or more of such poisons as mercury oxide, copper oxide, copper arsenite, and copper naphthenate.

(2) Paints prepared by kneading red oxide in gasoline in which coal tar and rosin are dissolved, and then by adding one or more of the said poisons.

However, marine paints of these types described are found unsatisfactory since the poisons as dispersed in the spreader are usually washed away by sea water in 8 to 10 months. Accordingly, it may be said that they are capable of inhibiting the growth of sea organisms and sea weeds for only a relatively short time and after this the surface rapidly becomes encrusted with barnacles and the surface requires scraping and repainting.

It has been considered to be almost impossible to protect hulls and structures from sea life such as barnacles and serpulae. However, the antifouling compositions of the present invention not only provide longer periods of retention than those used heretofore, but they are by far more effective in inhibiting the growth of sea organisms including barnacles ad serpulae. This is mainly due to the chemical properties of non-crystalline sodium silicate-colloidal aluminum silicate hydrate complex contained in said compositions.

Among all sea growths, barnacles and serpulae are regarded as the most harmful sea life to ships' bottoms and other structures immersed in sea water for a prolonged period of time, because once they have adhered to said objects, their calciferous shells are created and permanently stay there in the form of thanatocenose even after their death, thereby providing a convenient "foothold" for oysters, ascidians, sea mosses, teredos, gribbles, sea weeds and other sea growths.

Both barnacles and serpulae invariably begin to grow from roe to adults through the four stages of metamorphosis; that is, roe nauplius, metanauplius, and cypris. To be more precise, their fertilized roe hatches out and grows to metanauplii, and then to cypris larvae in a period of 1 to 10 days.

The cypris larvae are bivalved, and adhere to an object by means of their tentacles while floating or drifting in the water. They finally grow up to adults, i.e. barnacle or serpula, and then begin to secrete calcium carbonate to form shells.

In their early stages, barnacles and serpulae are both as small as poppy seeds, but their growth is surprisingly fast. In the South Sea, they usually grow as large as 2 to 3 centimeters in a week. The complex of non-crystalline the present invention, makes it difficult for cypris larvae which is to be added to the antifouling compositions of the present nvention, makes it difficult for cypris larvae to adhere to the objects immersed in sea water, or at least forces them to leave after they have adhered.

The complex of non-crystalline sodium silicate and colloidal aluminum silicate is formed merely upon ordinary admixture of the two silicates. Generally, the complex is formed by mixing from about 90 to 97 parts by weight of the non-crystalline sodium silicate with from about 10 to about 3 parts by weight of the colloidal aluminum silicate. No special steps are needed to form the complex.

This is one of the characteristic features of this invention, which has not been embodied in any other antifouling compositions. In preparing the antifouling compositions of this invention, powdery substances toxic to sea organisms of the types described are blended with a complex of a non-crystalline sodium silicate and colloidal aluminum silicate hydrate, and the resultant blend is pulverized into grains of mixed powder as fine as possible. Generally, the toxic substance is 10 to 15% of the total weight of the mixed powder coated with the gel of the synthetic resin. Said toxic substances include organic poisons such as 2,2'-dihydroxy-5,5'-dichloro-diphenyl methane

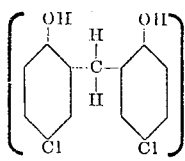

dihydroxy-tetrachloro-diphenyl methane

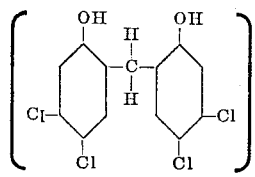

4,6-dinitro-O-cresol

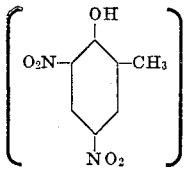

2,4-dinitro-6-sec-butyl phenol

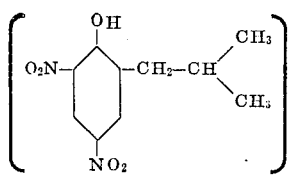

and P-chlorophenyl-1,1-dimethylurea

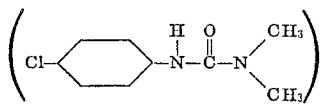

and inorganic poisons such as copper oxide, yellow mercuric oxide, acid naphthenate, copper arsenite and copper naphthenate. For the best results, the combined use of both oragnic and inorganic poisons is recommended. All grains of said pulverized mixture are coated with a water-soluble synthetic resin so that the surfaces of the grains are in a gel state, but coatings are not required to be even. The coating of the gel on the surface of the grains of powder is formed merely upon ordinary admixture of the grains of the complex-toxic substance mixture with the resin. Generally, from about 2 parts by weight of the resin is admixed with about one part by weight of the grains of powder containing the toxic substance and the complex.

Said water-soluble synthetic resins include polyvinyl alcohol, methyl cellulose, hydroxyethyl cellulose, ethylhydroxyethyl cellulose, polyvinyl pyrrolidine, and polyvinyl methyl ether, which are all excellent in saponification.

The pulverized material consisting of a mixture of the toxicant substance and the complex, whose surface is coated with a gel film of a water-soluble synthetic resin, is uniformly dispersed in a carrier, such as a carrier used for conventional marine paints. Thus, the antifouling compositions of the present invention are provided. The carrier can be any material that is suitable for underwater antifouling compositions, such as varnishes or synthetic resin paints.

According to the results of our extensive tests, no sea organisms are seen adhering to, or boring, the surfaces of the test samples immersed in sea water for a period of 12 to 18 months. The results of the tests on properties also show that said antifouling compositions are excellent in condensation, suitable for the use of brushes, and quick-drying, thus proving of their practical use.

The following specific examples are given to illustrate the procedure of blending the antifouling compositions of the present invention with conventional marine paints for ships' bottoms.

A pulverized mixture is prepared by blending 1 part by weight of a complex salt consisting of copper acetate and copper arsenite with 5 parts by weight of a non-crystalline sodium silicate-collidal aluminum silicate hydrate complex and 1 part by weight of 2,2'-dihydroxy-5,5'-dichloro diphenyl methane. The grains of powder thus formed are then coated with a polyvinyl alcohol to form a gel on the surface of the grains of powder. The coated fine grains are hereinafter referred to as agent A.

If required, a proportion of 1 part of a complex salt consisting of copper acetate and copper arsenite as described above to 1 or 2 parts of copper oxide or copper naphthenate may be included in agent A.

EXAMPLE 1

Antifouling composition for wooden ships' bottoms

| | Parts by weight |
|---|---|
| Pine resin | 15 |
| Linseed oil fatty acid | 3 |
| Creosote | 5 |
| Red oxide | 10 |
| Iron oxide | 10 |
| Cumarone resin | 10 |
| 20 parts of A agent dispersed in 100 parts of solvent naphtha | 35 |

EXAMPLE 2

Antifouling composition for wooden ships' bottoms

| | Parts by weight |
|---|---|
| Coaltar | 20 |
| Rosin | 30 |
| Mineral turpentine | 5 |
| Zinc white | 20 |
| 20 parts of A agent dispersed in 100 parts of gasoline | 40 |

EXAMPLE 3

Antifouling composition for steel ships' bottoms

| | Parts by weight |
|---|---|
| Red oxide | 10 |
| Zinc white | 6 |
| Mineral turpentine | 15 |
| Cumarone resin | 10 |
| 30 parts of A agent dispersed in 100 parts of varnish | 40 |

The composition prepared by the process of Example 1 Antifouling Composition for Wooden Ships' Bottoms is called "Aritokushi-check." The following table shows the results of performance tests conducted on "Aritokushi-check" and "Copper Paint" which is a marine paint on the market, evidencing that the former is superior to the latter.

TEST RESULTS ON MARINE PAINTS FOR SHIPS' BOTTOMS

|  | Number of holes | Large worms | Small worms |
|---|---|---|---|
| Testing materials (2 pcs.): | | | |
| Boring by sea worms | | | |
| Artokushi-check (paint): | | | |
| 1 | 0 | 0 | 0 |
| 2 | 0 | 0 | 0 |
| Copper paint (paint): | | | |
| 1 | 4 | 1 | 2 |
| 2 | 8 | 2 | 3 |
| Base Material (heart wood, not painted): | | | |
| 1 | Many | 8 | 20 |
| 2 | 20 | 10 | 6 |

|  | Aritokushi-check | Copper paint on the market | Base material (heart wood not painted) |
|---|---|---|---|
| Test sample (2 pcs. each). | | | |
| Adhering sea organisms | | | |
| Weight before immersion (g.) | 145 | 170 | 155 |
|  | 120 | 150 | 140 |
| Weight after immersion (g.) | 330 | 480 | 375 |
|  | 270 | 675 | 545 |
| Weight of organisms adhered (g.) | 10 | 195 | 60 |
|  | 20 | 400 | 310 |
| Water content (g.) | 175 | 125 | 160 |
|  | 130 | 125 | 90 |
| Names, Quantities, Ratios of Adhering sea organisms: | | | |
| Sea mussel (percent) | 0 | 90 | 50 |
|  | 0 | 100 | 75 |
| Barnacle (percent) | 1 | 5 | 30 |
|  | 4 | 10 | 60 |
| Oyster | 0 | 7 | 20 |
|  | 0 | 7 | 8 |
| Pearl oyster | 0 | 0 | 2 |
|  | 0 | 0 | 0 |
| Sea squirt | 0 | 1 | 9 |
|  | 0 | 2 | 8 |
| Sea moss | 0 | 5 | 10 |
|  | 0 | 4 | 40 |
| Laver (percent) | 0 | 0 | 0 |
|  | 0 | 0 | few |
| Sponge | 0 | 1 | 20 |
|  | 0 | 27 | 29 |
| Ecklonia cava (percent) | 0 | 0 | 4 |
|  | 0 | 137 | [1] 29 |

[1] Codium fragile.

NOTE.—Testing Place: Manazuru testing area of Takai District Fisheries Research Institute. Testing Period: From July 5, 1966 through August 5, 1967.

We claim:
1. An antifouling composition, comprising a dispersion of a mixed powder in a carrier, the mixed powder comprising a substance toxic to seat organisms and a complex of a non-crystalline sodium silicate and a colloidal aluminum silicate, the grains of said mixed powder being coated with a water-soluble synthetic resin in the state of a gel, said composition containing, in parts by weight:

35 parts of a dispersion of 20 parts of said coated mixed powder in 100 parts of solvent naphtha
15 parts pine resin
3 parts linseed oil fatty acid
5 parts creosote
10 parts red oxide
10 parts iron oxide
10 parts cumarone resin 2. The composition according to claim 1, containing, in parts by weight:

40 parts of a dispersion of 20 parts of said mixed powder in 100 parts of gasoline
20 parts coal tar
30 parts rosin
5 parts mineral turpentine
20 parts zinc white.

3. The composition according to claim 1, containing, in parts by weight:

40 parts of a dispersion of 30 parts of said mixed powder in 100 parts of varnish
10 parts red oxide
6 parts zinc white
15 parts mineral turpentine
10 parts cumarone resin.

References Cited

UNITED STATES PATENTS

| 2,970,923 | 2/1961 | Sparmann | 106—15 |
| 2,971,883 | 2/1961 | Swinyar | 167—31 |
| 2,979,410 | 4/1961 | Parlour | 99—171 |
| 3,058,839 | 10/1962 | Kemp | 106—15 |
| 3,171,779 | 3/1965 | McCoy et al. | 167—42 |

FOREIGN PATENTS 578,312   6/1946   Great Britain _____ 106—15

OTHER REFERENCES

Science, April 20, 1945, vol. 101, No. 2625, pp. 406 and 407.

HOSEA E. TAYLOR, Primary Examiner

R. W. GRIFFIN, Assistant Examiner

U.S. Cl. X.R.

106—15, 308; 117—132, 148, 149, 161, 165, 68; 260—17, 23, 27, 33.6, 41